(12) United States Patent
Gano et al.

(10) Patent No.: US 8,689,914 B2
(45) Date of Patent: Apr. 8, 2014

(54) OMNI-DIRECTIONAL WHEEL ASSEMBLY AND OMNI-DIRECTIONAL VEHICLE

(75) Inventors: John Victor Gano, Russin (CH); Enrique Hector Scalabroni, Russin (CH)

(73) Assignee: John Victor Gano, Russin (CH)

( * ) Notice: Subject to any disclaimer, the term of this patent is extended or adjusted under 35 U.S.C. 154(b) by 0 days.

(21) Appl. No.: 13/496,823

(22) PCT Filed: Apr. 20, 2011

(86) PCT No.: PCT/EP2011/056380
§ 371 (c)(1),
(2), (4) Date: Oct. 8, 2012

(87) PCT Pub. No.: WO2011/147648
PCT Pub. Date: Dec. 1, 2011

(65) Prior Publication Data
US 2013/0056288 A1 Mar. 7, 2013

(30) Foreign Application Priority Data

May 28, 2010 (WO) .................. PCT/IB2010/001296
Jun. 22, 2010 (WO) .................. PCT/IB2010/001652

(51) Int. Cl.
*B60K 7/00* (2006.01)
*B60G 7/00* (2006.01)
*B60B 19/00* (2006.01)

(52) U.S. Cl.
CPC .............. *B60G 7/006* (2013.01); *B60K 7/0007* (2013.01); *B60B 19/003* (2013.01)
USPC ....... 180/23; 180/24.07; 180/234; 280/86.75; 280/86.751

(58) Field of Classification Search
CPC .. B60B 19/003; B62D 17/00; B60G 2300/37; B60G 7/006; B60G 3/01; B60K 7/0007

USPC .................. 180/23, 65.51, 24.07, 24.08, 234; 280/86.75, 86.751
See application file for complete search history.

(56) References Cited

U.S. PATENT DOCUMENTS 2,533,752 A 12/1950 Alamagny
3,404,746 A 10/1968 Slay
(Continued)

FOREIGN PATENT DOCUMENTS

CN 2078249 U 6/1991
CN 1184744 A 6/1998
(Continued)

OTHER PUBLICATIONS

International Search Report for Application PCT/EP2011/056380 dated Jul. 7, 2011.

*Primary Examiner* — James English
(74) *Attorney, Agent, or Firm* — Honigman Miller Schwartz and Cohn LLP

(57) ABSTRACT

An omni-directional wheel assembly for a vehicle that includes a wheel, at least one lower suspension link and an upper attachment joint. Both the at least one lower suspension link and the upper attachment joint are attachable to the vehicle. The wheel is able to rotate at 360°, to steer the vehicle, around a pivot line positioned by the at least one lower suspension link and the upper attachment joint once attached to the vehicle. A projection of the pivot line onto a vertical projection plane comprises a vertical axis passing through a contact point between the wheel and ground defining a caster angle with the vertical axis, where whatever the orientation of the projection plane, the omni-directional wheel assembly includes an adjustment means able to adjust the caster angle within a predetermined range.

15 Claims, 4 Drawing Sheets

(56) References Cited

U.S. PATENT DOCUMENTS

| | | | |
|---|---|---|---|
| 5,498,018 A | 3/1996 | Wahl et al. | |
| 6,024,381 A * | 2/2000 | Mottola | 280/767 |
| 6,094,846 A * | 8/2000 | Feller | 37/270 |
| 7,401,794 B2 * | 7/2008 | Laurent et al. | 280/5.514 |
| 7,464,785 B2 * | 12/2008 | Spark | 180/236 |
| 7,744,102 B2 * | 6/2010 | Bailey et al. | 280/47.38 |
| 7,823,673 B2 * | 11/2010 | Asogawa | 180/209 |
| 2002/0170764 A1 | 11/2002 | Oshima et al. | |
| 2006/0017248 A1 | 1/2006 | Kang | |
| 2008/0065265 A1 * | 3/2008 | Ozick et al. | 700/245 |
| 2008/0125938 A1 | 5/2008 | Pierpont | |
| 2009/0288904 A1 | 11/2009 | Chang | |
| 2013/0020775 A1 * | 1/2013 | Beji | 280/43 |
| 2013/0098695 A1 * | 4/2013 | Itou et al. | 180/6.28 |

FOREIGN PATENT DOCUMENTS

| | | |
|---|---|---|
| CN | 201161631 Y | 12/2008 |
| DE | 3333476 A1 | 12/1984 |
| DE | 3533216 A1 | 3/1987 |
| GB | 1062102 A | 3/1967 |
| KR | 2007014782 A | 2/2007 |
| WO | WO-9819875-1 | 5/1998 |
| WO | WO-0032462 A1 | 6/2000 |
| WO | WO-2005030509 A1 | 4/2005 |
| WO | WO-2010150286 A1 | 12/2010 |

* cited by examiner

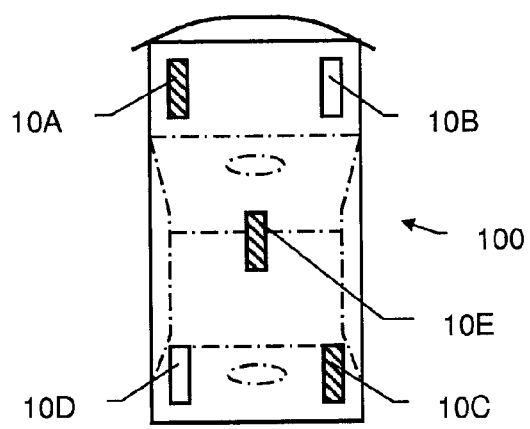
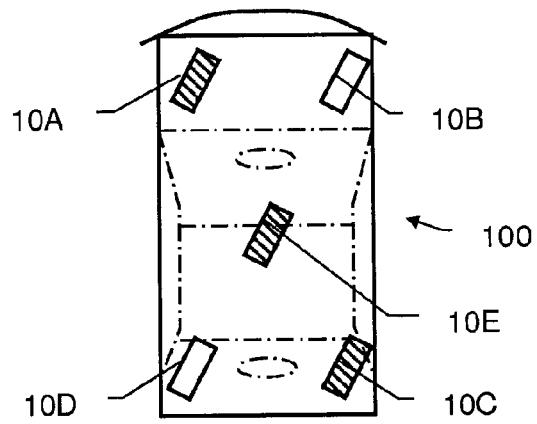
Fig. 7
Fig. 8

OMNI-DIRECTIONAL WHEEL ASSEMBLY AND OMNI-DIRECTIONAL VEHICLE

The present invention relates to a wheel assembly and especially to an Omni-directional wheel assembly and to an electric Omni-directional vehicle equipped with such Omni-directional wheel assembly.

Different ways to provide Omni-directional vehicles are known from the prior art. For example, the document WO2010/150286 describes a five wheel vehicle. Each wheel is able to rotate at 360° around a pivot line, so that the vehicle is able to move in all the directions. The vehicle is powered by a central wheel equipped with an electric motor. The pivot lines of the front and rear wheels may be inclined frontward or rearward. This vehicle presents the disadvantage of having an unstable behavior in situations when it moves in a transverse direction, as the position of the pivot lines result in asymmetrical stress on the tires and does not provide any self centering for the steering. This phenomenon is made worse if the wheel is powered as the traction force also creates an additional pull back force to the wheel when it is rotated around the pivot line. This drawback results in safety issues as the vehicle may create violent reactions that may endanger the occupants, in some emergency situations such as an emergency evasive maneuver: the wheels will not have a stable position in the new transverse direction of movement and this will create negative reactions to the change of direction. It should be also noted that this architecture leads to an increased abrasion on the tires reducing their lifetime. The proposed central wheel present no caster angle or distance: its stability is questionable at high speeds. Another source of efficiency loss is the unique powered central wheel. If the power has to be increased, the motor will be enlarged and its weight will increase significantly, leading in issues to withstand the induced effects of the unsprung mass. Another point is that this central powered wheel makes the vehicle very sensitive to the road conditions and its traction may easily be lowered as if the unique powered wheel meets reduced adherence conditions, no other powered wheel will be able to compensate the reduction of traction force. Lastly, this vehicle presents a technical complexity leading to cost increase, as the peripheral wheels have a first configuration and the central one present another design, so that the parts cannot be standardized to lower the costs.

The document U.S. Pat. No. 3,404,746 describes another example of omni-directional vehicle. The vehicle has five wheels, four swivel casters located at the corners and one 360° steering wheel powered by a motor located on the vehicle frame. The use of swivel casters leads to a technical complexity with a double suspension arm to allow a vertical movement to the wheels. Moreover, to have a correct stability, the distance between the wheel axle and steering joint, the trailing distance, has to be important and then the assembly requires a great free space to allow the wheel to rotate around the pivot line or treeing axis. These disadvantages are well known and this is the reason why this design is not used in the automotive industry and is limited to the area of aircrafts. Concerning the motor, the transmission of the power from the motor to the wheel is complex and expensive.

The present invention aims to solve these aforementioned drawbacks and is directed to propose first an omni-directional wheel assembly able to provide great stability whatever the direction of movement of the vehicle, with an ability also to adapt the stability of the wheel assembly in real time to the travelling conditions of the vehicle. A second aim is to provide the ability to adapt a vehicle to user's requirements of performance.

With this goal in mind, a first aspect of the invention is an omni-directional wheel assembly for a vehicle comprising a wheel and at least one lower suspension link and an upper attachment joint, both being able to be attached to the vehicle, the wheel being able to rotate at 360°, to steer the vehicle, around a pivot line positioned by said at least one lower suspension link and said upper attachment joint once attached to the vehicle, a projection of the pivot line onto a vertical projection plane comprising a vertical axis passing through a contact point between the wheel and ground defining a caster angle with said vertical axis, characterized in that whatever the orientation of the projection plane, the omni-directional wheel assembly comprises adjustment means able to adjust the caster angle within a predetermined range. The invention supplies a wheel assembly able to rotate at 360° around its pivot axis with a controlled stability as the caster angle is able to be adjusted accordingly. In other words, the Omni-directional wheel assembly according to the present invention is able to adjust the caster angle to the direction steered by the wheel, at 360° around a vertical axis. In consequence, the stability of such wheel assembly is enhanced, as there is no back force exerted by the tire to pull back the wheel in the vehicle longitudinal direction. The steering mechanism necessary to command such wheel assembly may also be simplified as the efforts exerted will be lowered. The use of the invention provides an enhanced stability of the vehicle, but also allows cost and weight reduction on the steering mechanism.

Advantageously, the adjustment means are able to set up the caster angle at a first predetermined value corresponding to standard driving conditions and at least at a second predetermined value corresponding to emergency driving conditions. The invention provides the ability to adjust the caster angle to different transportation conditions (in city or on highways), to optimize the vehicle handling. In other words, the adjustment means are able to adjust the orientation of the caster angle at a first value if standard comfort and stability are desired, or if maximum stability or adherence are required such as an evasive collision avoidance maneuver, to a second value.

Advantageously, the adjustment means are able to adjust the caster angle during driving conditions, in response to a command related to driving conditions. The invention simplifies the use of the wheel assembly as the adjustment is automatic in real time, in response to a command sent by a command unit of the vehicle for example. It may be also possible to have a mechanical link between the steering mechanism and the adjustment means to provide the automatic adjustment function.

Ideally, the adjustment means are able to adjust the position of the upper attachment joint. The Omni-directional wheel assembly according to the present invention is easy to use, as the adjustment of the pivot line orientation is enabled by a movement of the upper attachment joint. There is no need to modify the lower suspension links which are generally complex, heavy and subjected to high forces. The upper attachment joint is easily moveable in regard to the low-efforts applied to this joint.

Advantageously, the upper attachment joint comprises a case able to rotate around a reference axis, further comprises a ball pivot belonging to the pivot line, the ball pivot is mounted in the case at a predetermined distance from the reference axis and the rotation of the case around the reference axis is able to adjust the caster angle. This embodiment to set up in 360° the value of the caster angle is economic as the ball pivot belonging to the pivot line is mounted in an eccentric case, and the rotation of the eccentric case will orientate the pivot angle in the proper direction.

Ideally, the predetermined distance is adjustable. This embodiment makes the adjustment to the two different values economic and easy to set up. It is the distance that will set the caster angle at the desired value.

Advantageously, the Omni-directional wheel assembly comprises a steering mechanism able to steer the wheel. The assembly may directly comprise the steering mechanism, the rest of the vehicle will be simplified.

Advantageously, the Omni-directional wheel assembly comprises a brake able to brake the wheel. The assembly may comprise a braking device, so that, upon request, it is easy to modulate the functions supplied by the assembly.

Advantageously, the Omni-directional wheel assembly comprises at least one electric motor able to rotate the wheel around a spinning axis to apply a moving force on the vehicle. The modularity is complete; as such assembly may power the vehicle. The assembly is able to respond to different requirements from the user, as it may steer, brake, or power the vehicle. It is easy to adapt the vehicle to the user needs. It may be foreseen to propose to the public a vehicle with one powered wheel for city or summer use, and to supply powered wheel assemblies to replace the non-powered wheel assemblies if the client wants to increase the power or the traction ability if the adherence is poor, as it may be under winter conditions.

The invention is also related to a vehicle comprising at least four omni-directional wheel assemblies as claimed in any one of claims 1 to 8, characterized in that two of said omni-directional wheel assemblies are powered, each powered omni-directional wheel assembly comprising at least one electric motor able to rotate the wheel around a spinning axis to apply a moving force on the vehicle, and in that the said two powered omni-directional wheel assemblies are arranged on the vehicle so that the vertical projection of the moment created by the moving forces on the vehicle is null when all the omni-directional wheel assemblies have the same orientation. The vehicle according to the present invention includes wheel assemblies according the first aspect. Thus, the stability of the vehicle is increased in all the directions of driving, even when the vehicle is moving in a transverse direction. This is particularly important in an evasive driving maneuver, in emergency conditions. Moreover, the arrangement of the wheel assemblies on the vehicle, with zero vertical torque applied on the vehicle, simplifies the design, as whatever the direction of movement, the non-powered wheels will not have to withstand any vertical torque. In other words, in a purely transverse direction of movement, thanks to the arrangement of the powered wheel assemblies, the non-powered wheels are not required to have a steering mechanism, as in the absence of vertical torque on the vehicle, it is not necessary to steer all the wheels. The non powered wheel may be simple free wheels and consequently, the cost is reduced.

Advantageously, the said two powered omni-directional wheel assemblies are located symmetrically with respect to a central point of the vehicle. This embodiment is advantageous to nullify the vertical torque created by the traction forces.

The invention is also related to a vehicle comprising at least five omni-directional wheel assemblies as claimed in any one of claims 1 to 8, characterized in that three of said Omni-directional wheel assemblies are powered, each powered omni-directional wheel assembly comprising at least an electric motor able to rotate the wheel around a spinning axis to apply a moving force on the vehicle, and in that the said three powered omni-directional wheel assemblies are arranged on the vehicle so that the vertical projection of the moment created by the moving forces on the vehicle is null when all the omni-directional wheel assemblies have the same orientation. The vehicle according to the present invention includes wheel assemblies according the first aspect. Thus, the stability of the vehicle is increased in all the directions of driving, even when the vehicle is moving in a transverse direction. This is particularly important in an evasive driving maneuver, in emergency conditions. Moreover, the arrangement of the wheel assemblies on the vehicle, with zero vertical torque applied on the vehicle, simplifies the design, as whatever the direction of movement, the non-powered wheels will not have to withstand any vertical torque. In other words, in a purely transverse direction of movement, thanks to the arrangement of the powered wheel assemblies, the non-powered wheels are not required to have a steering mechanism, as in the absence of vertical torque on the vehicle, it is not necessary to steer all the wheels. The non powered wheel may be simple free wheels and consequently, the cost is reduced.

Advantageously, a first powered omni-directional wheel assembly is located at a central point of the vehicle and in that the two other powered omni-directional wheel assemblies are located symmetrically with respect to the first powered omni-directional wheel assembly. This embodiment is advantageous to nullify the vertical torque created by the traction forces.

The invention is also related to a vehicle comprising at least five omni-directional wheel assemblies as claimed in claim 9, characterized in that said omni-directional wheel assemblies are located on the vehicle so that the vertical projection of the moment created by the moving forces on the vehicle is null when all the omni-directional wheel assemblies have the same orientation. The vehicle according to the present invention includes wheel assemblies according the first aspect. Thus, the stability of the vehicle is increased in all the directions of driving, even when the vehicle is moving in a transverse or oblique direction. This is particularly important in an evasive driving maneuver, in emergency conditions. Moreover, the arrangement of the wheel assemblies on the vehicle, with zero vertical torque applied on the vehicle, simplifies the design, as whatever the direction of movement, the wheels will not have to withstand any vertical torque.

The invention is also related to a vehicle comprising at least five omni-directional wheel assemblies as claimed in any one of claims 1 to 8, characterized in that at least five of said omni-directional wheel assemblies are powered, each powered omni-directional wheel assembly comprising at least an electric motor able to rotate the wheel around a spinning axis to apply a moving force on the vehicle, and in that the said at least five powered omni-directional wheel assemblies are arranged on the vehicle so that the vertical projection of the moment created by the moving forces on the vehicle is null when all the omni-directional wheel assemblies have the same orientation. The vehicle according to the present embodiment is optimized for large capacities of transportation. It may be a bus or a truck, and its ability to move in all directions is real as the stability is given by the wheel assemblies according to the first aspect. Traveling in crowed city conditions or parking the vehicle for loading or unloading is now easy with the present invention. Safety of long and/or heavy load vehicles such as busses or trailer trucks is also enhanced as the adjustment of the caster angle will improve their behavior and braking performance to prevent risks of sliding out or jackknifing.

Other characteristics and advantages of the present invention will appear more clearly from the following detailed description of particular non-limitative examples of the invention, illustrated by the appended drawings where:

FIG. 4 represents a partial view of the omni-directional wheel assembly of FIG. 1;

FIG. 7 represents a top view of a vehicle according to another embodiment of the invention;

FIG. 8 represents a top view of the vehicle of FIG. 7;

Figure 1:
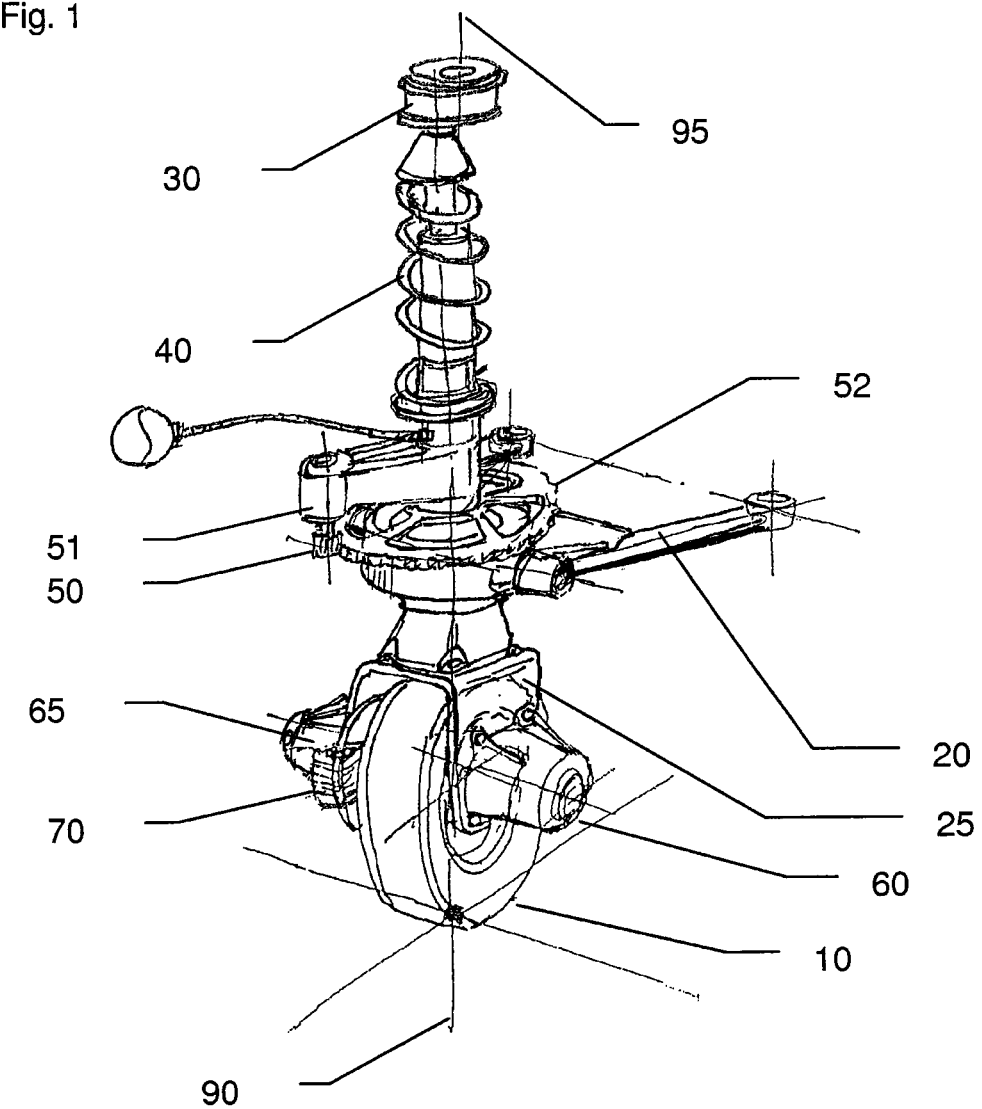
FIG. 1 represents a perspective view of an omni-directional wheel assembly according to the invention.

The omni-directional wheel assembly represented at FIG. 1 comprises a wheel 10 mounted on a fork 25 and able to rotate at 360° around the pivot line 90. This ability allows the vehicle equipped with such omni-directional wheel assembly to steer in all the directions. The user can easily steer the vehicle to park in small-access lots or to move in traffic jam conditions. In this aim, the assembly is equipped with a steering mechanism 50 comprising a steering electric motor 51 engaged with a circular steering rack. Additionally, the assembly further comprises two electric motors 60, 65 to apply a moving force to the vehicle although one motor may suffice and a brake device 70 to stop the vehicle if needed. The suspension assembly 40 comprises a suspension spring associated to a suspension damper. The assembly is linked to the vehicle by a lower suspension arm 20 and an upper attachment joint 30. These two elements define the geometry of the wheel assembly in vehicle and especially the caster angle which is the projection of the pivot line 90 on a vertical projections plane comprising a vertical axis passing through a contact point of the tire with the ground. The invention provides an adjustable caster angle in all directions, as the upper attachment joint 30 is able to move the upper position of the pivot line 90 by rotating around the reference axis 95. To allow the conical movement of the pivot line 90, the fork 25 is linked to the lower suspension arm trough a pivot joint which allows the necessary three rotations between these two parts.

Figure 2:
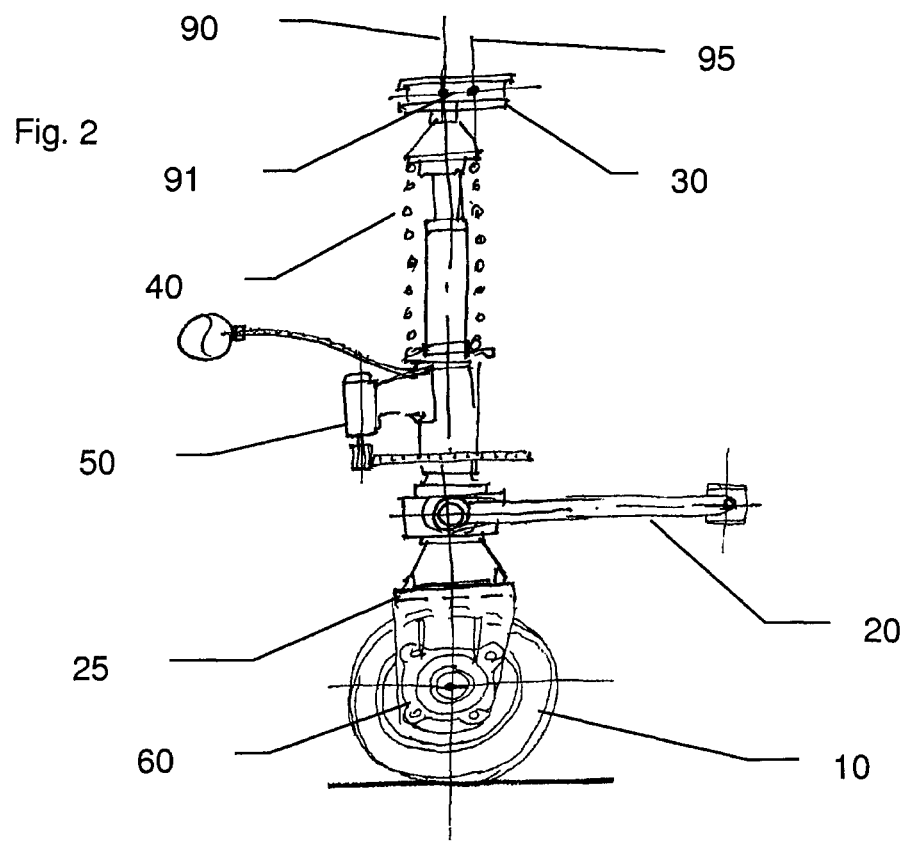
FIG. 2 represents a side view of the omni-directional wheel assembly of FIG. 1.

FIG. 2 represents a side view of the omni-directional wheel assembly of FIG. 1, alone and not mounted in a vehicle. The adjustment of the caster angle in any direction is permitted by the distance between the two axes 90 and 95. The upper point 91 of the pivot line 90 in mounted in an eccentric part of the attachment joint 30 able to rotate around the reference axis 95. This allows the adjustment in 15 all the directions of the caster angle. When mounted in a vehicle, the caster angle is defined by the projection of the pivot line 90 in a vertical plane and a vertical axis (not shown on FIG. 2) belonging to the vertical plane.

Figure 3:
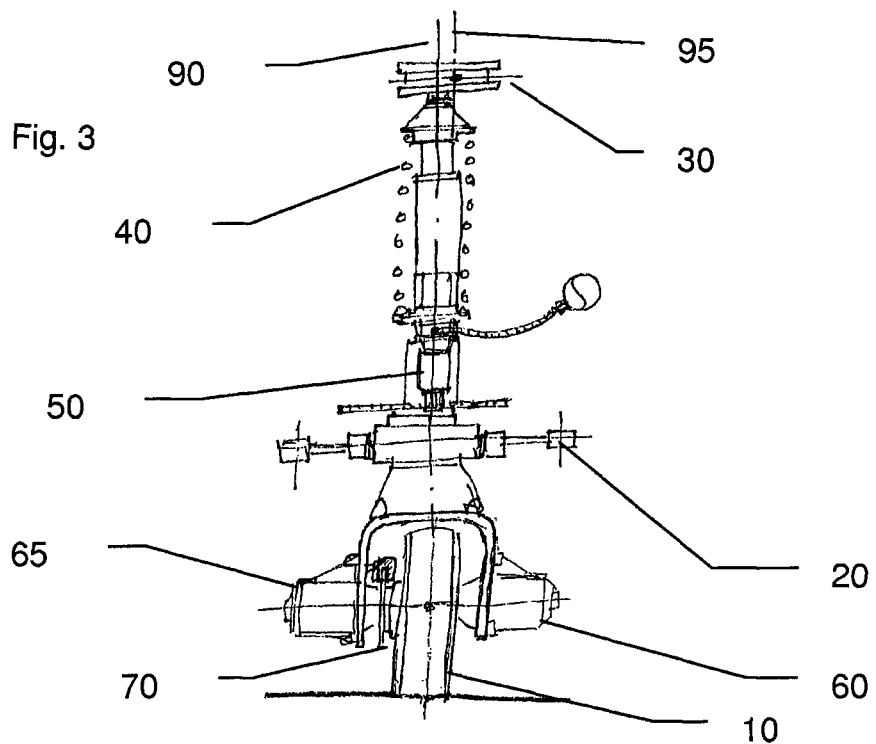
FIG. 3 represents a front view of the omni-directional wheel assembly of FIG. 1.

FIG. 3 is a front view of the omni-directional wheel assembly of the FIG. 1, showing the distance between the axis 90 and 95 that permit the adjustment of the caster angle.

The FIG. 4 shows in detail the upper attachment joint 30. A pivot ball 32 belongs to the pivot axis and its center, the point 91 is the upper point of the pivot line 90. The pivot ball 32 is mounted in an eccentric case 35 able to rotate around the axis 95 under the command of the electric motor 38. The distance between the two axes 90 and 95, in association with the angular position of the eccentric case 35 define the value of the caster angle which is the projection of the pivot line 90 onto a vertical projection plane. Since the eccentric case 35 is able to rotate around the reference axis 95, the caster angle is adjustable, whatever the orientation of the vertical projection line. One variant may also to have the distance between the two axes adjustable. Consequently, the caster angle may be adjusted by the rotation of the eccentric case and/or by modifying the distance between the axis 90 and 95.

Figure 5:
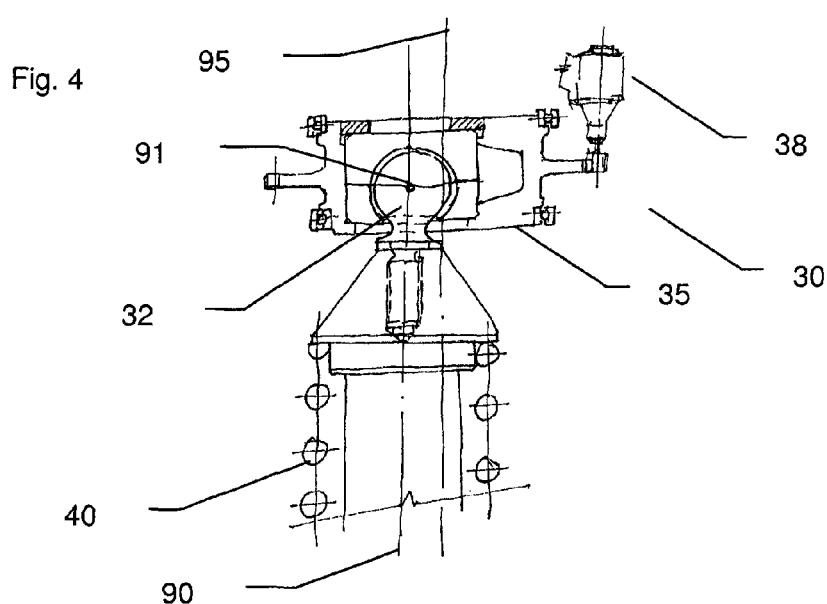
FIG. 5 represents a top view of a vehicle according to an embodiment of the invention.

FIG. 5 represents a top view of an omni-directional vehicle including the omni-directional wheel assembly previously described. The vehicle 100 comprise four wheels 10A, 10B, 10C, 10D. Two of these wheels are powered, the wheels 10A and 10C. They are arranged symmetrically with respect to the central point 110, which may be the center of gravity. In consequence, the two powered wheel assemblies 10A, 10C will apply moving forces to the vehicle, and with the symmetrical arrangement of the powered wheels 10A, 10C, the vertical moment applied to the vehicle is null.

Figure 6:
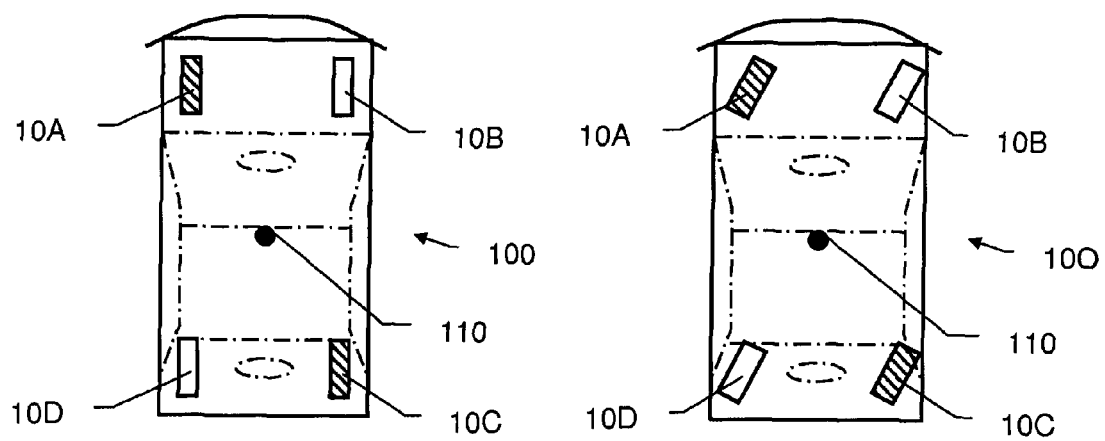
FIG. 6 represents a top view of the vehicle of FIG. 5.

FIG. 6 represents a top view of the omni-directional vehicle of FIG. 5, in particular driving conditions. The four wheels 10A, 10B, 10C, 10D are oriented in the same direction. It may be for moving the vehicle to a small access area or to avoid an obstacle. With the symmetrical arrangement of the powered wheels 10A, 10C, the vertical moment resulting from the moving forces applied to the vehicle, the stability is enhanced and there is not any interference effort applied to the vehicle. This point is crucial in emergency situations where the adherence may be lost if there are unexpected reaction efforts applied to the vehicle. In addition, the adjustment of the caster angle provided by the wheel assemblies according to the first aspect of the invention, the behavior of the vehicle in direction changes is secured and enhanced.

FIG. 7 and FIG. 8 represent top views of a five omni-directional wheels 10A, 10B, 10C, 10D, 10E vehicle according to the invention, having three powered omni-directional wheels 10A, 10C, 10E. The powered wheels are symmetrically arranged with respect to the central point of the vehicle: one first powered omni-directional wheel 10E is arranged at the central point, and the two other powered omni-directional wheels are arranged symmetrically with respect to the central wheel. The same stability advantages as described at FIG. 6 are obtained, but the vehicle has more power and is also less sensitive to slippage if the vehicle is driven by poor adherence conditions.

It is understood that obvious improvements and/or modifications for one skilled in the art may be implemented, being under the scope of the invention as it is defined by the appended claims. Especially, it is may be foreseen to use the invention on a four wheel drive vehicle. Concerning the adjustment of the caster angle, it may be planned to use linear mobile joints to vary the distance between the reference axis and the pivot line. It is also possible to control automatically, independently or simultaneously each caster angle of each wheel assembly equipping a vehicle. It should be noted that the invention may also be used for a bi-directional steering vehicle.

The invention claimed is:

1. An omni-directional wheel assembly for a vehicle, the omni-directional wheel assembly comprising:
  a wheel; and
  at least one lower suspension link; and
  an upper attachment joint;
  wherein the at least one lower suspension link and the upper attachment joint are attachable to the vehicle, the wheel being able to rotate at 360°, to steer the vehicle, around a pivot line positioned by the at least one lower suspension link and the upper attachment joint once attached to the vehicle, a projection of the pivot line onto a vertical projection plane comprising a vertical axis passing through a contact point between the wheel and ground defining a caster angle with the vertical axis, wherein whatever the orientation of the projection plane, the omni-directional wheel assembly comprises an adjustment means able to adjust the caster angle within a predetermined range.

2. The omni-directional wheel assembly of claim 1, wherein the adjustment means are able to set up the caster angle at a first predetermined value corresponding to standard driving conditions and at least at a second predetermined value corresponding to emergency driving conditions.

3. The omni-directional wheel assembly of claim 1 wherein the adjustment means are able to adjust the caster angle during driving conditions, in response to a command related to driving conditions.

4. The omni-directional wheel assembly of claim 1, wherein the adjustment means are able to adjust the position of the upper attachment joint.

5. The omni-directional wheel assembly of claim 1, wherein the upper attachment joint comprises a case able to rotate around a reference axis, further comprising a ball pivot belonging to the pivot line, in that the ball pivot is mounted in the case at a predetermined distance from the reference axis and in that the rotation of the case around the reference axis is able to adjust the caster angle.

6. The omni-directional wheel assembly of claim 5, wherein the predetermined distance is adjustable.

7. The omni-directional wheel assembly of claim 1, further comprising a steering mechanism able to steer the wheel.

8. The omni-directional wheel assembly of claim 1, further comprising a brake able to brake the wheel.

9. The omni-directional wheel assembly of claim 1, further comprising at least one electric motor able to rotate the wheel around a spinning axis to apply a moving force on the vehicle.

10. A vehicle comprising:
at least four omni-directional wheel assemblies, at least one omni-directional wheel assembly comprising:
a wheel; and
at least one lower suspension link; and
an upper attachment joint;
wherein the at least one lower suspension link and the upper attachment joint are attachable to the vehicle, the wheel being able to rotate at 360°, to steer the vehicle, around a pivot line positioned by the at least one lower suspension link and the upper attachment joint once attached to the vehicle, a projection of the pivot line onto a vertical projection plane comprising a vertical axis passing through a contact point between the wheel and ground defining a caster angle with the vertical axis, wherein whatever the orientation of the projection plane, the omni-directional wheel assembly comprises an adjustment means able to adjust the caster angle within a predetermined range;
two of the omni-directional wheel assemblies each powered and comprising at least one electric motor able to rotate the wheel around a spinning axis to apply a moving force on the vehicle, and in that the two powered omni-directional wheel assemblies are arranged on the vehicle so that the vertical projection of the moment created by the moving forces on the vehicle is null when all the omni-directional wheel assemblies have the same orientation.

11. The vehicle of claim 10, wherein the two powered omni-directional wheel assemblies are located symmetrically with respect to a central point of the vehicle.

12. A vehicle comprising:
at least five omni-directional wheel assemblies, at least one omni-directional wheel assembly comprising:
a wheel; and
at least one lower suspension link; and
an upper attachment joint;
wherein the at least one lower suspension link and the upper attachment joint are attachable to the vehicle, the wheel being able to rotate at 360°, to steer the vehicle, around a pivot line positioned by the at least one lower suspension link and the upper attachment joint once attached to the vehicle, a projection of the pivot line onto a vertical projection plane comprising a vertical axis passing through a contact point between the wheel and ground defining a caster angle with the vertical axis, wherein whatever the orientation of the projection plane, the omni-directional wheel assembly comprises an adjustment means able to adjust the caster angle within a predetermined range;
three of the omni-directional wheel assemblies each powered and comprising at least one electric motor able to rotate the wheel around a spinning axis to apply a moving force on the vehicle, and in that the three powered omni-directional wheel assemblies are arranged on the vehicle so that the vertical projection of the moment created by the moving forces on the vehicle is null when all the omni-directional wheel assemblies have the same orientation.

13. The vehicle of claim 12, wherein a first powered omni-directional wheel assembly is located at a central point of the vehicle and in that the two other powered omni-directional wheel assemblies are located symmetrically with respect to the first powered omni-directional wheel assembly.

14. A vehicle comprising:
at least five omni-directional wheel assemblies, at least one omni-directional wheel assembly comprising:
a wheel; and
at least one lower suspension link; and
an upper attachment joint;
wherein the at least one lower suspension link and the upper attachment joint are attachable to the vehicle, the wheel being able to rotate at 360°, to steer the vehicle, around a pivot line positioned by the at least one lower suspension link and the upper attachment joint once attached to the vehicle, a projection of the pivot line onto a vertical projection plane comprising a vertical axis passing through a contact point between the wheel and ground defining a caster angle with the vertical axis, wherein whatever the orientation of the projection plane, the omni-directional wheel assembly comprises an adjustment means able to adjust the caster angle within a predetermined range;
wherein the omni-directional wheel assemblies are located on the vehicle so that the vertical projection of the moment created by the moving forces on the vehicle is null when all the omni-directional wheel assemblies have the same orientation.

15. A vehicle comprising:
at least five omni-directional wheel assemblies, at least one omni-directional wheel assembly comprising:
a wheel; and
at least one lower suspension link; and
an upper attachment joint;
wherein the at least one lower suspension link and the upper attachment joint are attachable to the vehicle, the wheel being able to rotate at 360°, to steer the vehicle, around a pivot line positioned by the at least one lower suspension link and the upper attachment joint once attached to the vehicle, a projection of the pivot line onto a vertical projection plane comprising a vertical axis passing through a contact point between the wheel and ground defining a caster angle with the vertical axis, wherein whatever the orientation of the projection plane, the omni-directional wheel assembly comprises an adjustment means able to adjust the caster angle within a predetermined range;

wherein the at least five of the omni-directional wheel assemblies are each powered and comprise at least one electric motor able to rotate the wheel around a spinning axis to apply a moving force on the vehicle, and in that the at least five powered omni-directional wheel assemblies are arranged on the vehicle so that the vertical projection of the moment created by the moving forces on the vehicle is null when all the omni-directional wheel assemblies have the same orientation.

* * * * *